United States Patent [19]

Bilbro et al.

[11] Patent Number: 6,021,241

[45] Date of Patent: Feb. 1, 2000

[54] SYSTEMS AND METHODS FOR USING DIFFRACTION PATTERNS TO DETERMINE RADIATION INTENSITY VALUES FOR AREAS BETWEEN AND ALONG ADJACENT SENSORS OF COMPOUND SENSOR ARRAYS

[75] Inventors: Griff Luhrs Bilbro; Wesley Edwin Snyder, both of Raleigh, N.C.; Anthony Zilic, King George, Va.

[73] Assignee: North Carolina State University, Raleigh, N.C.

[21] Appl. No.: 09/118,745

[22] Filed: Jul. 17, 1998

[51] Int. Cl.[7] ....................................... G02B 6/34
[52] U.S. Cl. ............................ 385/37; 385/115; 385/116; 385/10
[58] Field of Search .................................. 385/9, 10, 37, 385/115, 116, 119, 120, 121

[56] References Cited

U.S. PATENT DOCUMENTS

| | | | |
|---|---|---|---|
| 4,859,012 | 8/1989 | Cohn | 385/115 X |
| 5,465,284 | 11/1995 | Karellas | 378/62 |
| 5,550,380 | 8/1996 | Sugawara et al. | 250/370.11 |

OTHER PUBLICATIONS

K.D. Möller, *Optics*, University Science Books, pp. 127–176 (1988).

*Primary Examiner*—Phan T. H. Palmer
*Attorney, Agent, or Firm*—Myers Bigel Sibley & Sajovec, P.A.

[57] ABSTRACT

An array of optical fiber bundles includes one or more diffractive elements positioned above gaps between adjacent bundles. Incident radiation produces mathematically determinative diffraction patterns on the respective input faces of the adjacent bundles. Radiation intensity values for areas between and along the abutting edges of adjacent optical fiber bundles can be determined using the diffraction patterns. These intensity values can be assigned to other pixels so that precise, seamless images can be reconstructed.

27 Claims, 10 Drawing Sheets

| 1  | 2  | 3  | 4  | 5  | 6  | 7  | 8  |
|----|----|----|----|----|----|----|----|
| 2  | 1  | 4  | 3  | 5  | 6  | 8  | 7  |
| 9  | 10 | 11 | 12 | 13 | 14 | 15 | 16 |
| 9  | 11 | 10 | 12 | 13 | 14 | 15 | 16 |

⋮

| 113 | 114 | 115 | 116 | 117 | 118 | 119 | 120 |
|-----|-----|-----|-----|-----|-----|-----|-----|
| 110 | 111 | 115 | 116 | 117 | 119 | 120 | 118 |

↑ 95 PIXEL MAP

Fig. 10C

| 1 | 2   | 3    | 4    | 5    | 6   | 7 | 8 |
|---|-----|------|------|------|-----|---|---|
| 0 | 150 | 2500 | 2400 | 2000 | 150 | 0 | 0 |
| 9   | 10  | 11   | 12   | 13   | 14 | 15 | 16 |
| 150 | 150 | 2600 | 2700 | 7000 | 80 | 90 | 0  |

⋮

| 113    | 114    | 115    | 116 | 117 | 118 | 119 | 120    |
|--------|--------|--------|-----|-----|-----|-----|--------|
| 30,000 | 20,000 | 15,000 | 150 | 0   | 0   | 10  | 15,500 |

↑ 97 STORED IMAGE

Fig. 10D

SYSTEMS AND METHODS FOR USING DIFFRACTION PATTERNS TO DETERMINE RADIATION INTENSITY VALUES FOR AREAS BETWEEN AND ALONG ADJACENT SENSORS OF COMPOUND SENSOR ARRAYS

FIELD OF THE INVENTION

The present invention relates generally to radiation detection and, more particularly, to radiation detection using compound sensor arrays.

BACKGROUND OF THE INVENTION

Tapered optical fiber bundles can provide a low distortion method of magnifying or reducing an image. Used with a charge coupled device (CCD) sensor, tapered optical fiber bundles may be employed in medical radiography, fluoroscopy, and dental radiography, for enhancing images and reducing x-ray exposure times. Exemplary tapered optical fiber bundles are described in an article entitled "Fiberoptic Tapers Offer High-Quality Image Transmission" by Richard J. Weiss (http://192.149.147.16/web/oer/ february/ feb97/research.html), which is incorporated herein by reference in its entirety.

Multiple CCDs may be arranged in an array to form a compound image sensor. Compound image sensor arrays may be utilized to capture images that are larger than a single CCD device can capture. Arrays of tapered optical fiber bundles may be utilized wherein each optical fiber bundle in the array is coupled with a respective CCD sensor. Tapered optical bundles may be required to compensate for gaps between adjacent CCD sensors and for electronics surrounding individual CCD sensors.

To provide coverage of a focal plane that is as nearly seamless as possible, precise alignment of adjacent optical fiber bundles in an array may be required. Abutting edges of adjacent optical fiber bundles may need to be mated within a tolerance of hundreds of microns in a single plane in order to produce substantially seamless images. Accordingly, the focal plane edges of optical fiber bundles may need to be carefully analyzed so that adjacent bundles can be mated as seamlessly as possible. As a result, conventional assembly techniques for precisely aligning adjacent optical fiber bundles within an array may be expensive and labor-intensive.

In addition, because of conventional manufacturing techniques, the edges of optical fiber bundles may be irregular and of poor quality. Consequently, precise, abutting alignment between adjacent bundles may not be possible. As a result, gaps may be present between adjacent optical fiber bundles in an array. These gaps may result in images having seams or other imperfections. In addition, because optical fiber bundles are conventionally molded or milled, the outermost optical fibers at the input face of a bundle may be damaged and thereby rendered optically inactive. Accordingly, portions of an image falling on optically inactive optical fibers within a bundle may not be captured by an image sensor coupled to the bundle. As a result, seams or other imperfections within the image may be produced.

SUMMARY OF THE INVENTION

It is therefore an object of the present invention to allow reduction in the time and cost of assembling tapered optical fiber bundles used in imaging sensor arrays.

It is also an object of the present invention to provide optical fiber bundle arrays that can produce substantially seamless images even though some of the optical fibers within an array are optically inactive or there are gaps between adjacent optical fiber bundles.

These and other objects of the present invention are provided by an array of optical fiber bundles wherein one or more diffractive elements are positioned above gaps between adjacent bundles such that incident radiation produces diffraction patterns on the respective input faces of the adjacent bundles. Radiation intensity values for areas between and along the abutting edges of adjacent optical fiber bundles can be determined using the diffraction patterns. These intensity values can be assigned to other pixels so that precise, seamless images can be reconstructed.

Exemplary diffractive elements may include wires and other solid objects, as well as diffraction gratings. To produce a diffraction pattern, the width of a diffraction grating slit (or the thickness of a wire or solid object) is preferably less than or equal to the wavelength of the incident radiation. A compound image sensor array incorporating aspects of the present invention may produce a substantially seamless image even though gaps exist between adjacent optical fiber bundles and even though optically inactive areas within the bundle array exist. Furthermore, the present invention may be utilized with adjacent optical fiber bundles having irregular shaped edge portions.

Each optical fiber bundle includes an output face and an opposite input face and directs radiation emitted from a source to an array of image sensors along a longitudinal direction. Each input face may be substantially normal to the longitudinal direction and may be configured to receive incident radiation from a source thereon. Optical fibers within each bundle may be tapered such that a diameter of an optical fiber is less at the output face than at the input face of a bundle.

According to another aspect of the present invention, steps for producing a compound image sensor array include abutting a plurality of optical fiber bundles to one another to form an array; and positioning a diffractive element above abutting edges of at least two respective adjacent optical fiber bundles. The diffractive element may be configured to diffract radiation in a mathematically determinative (i.e., predictable) pattern on the input faces of the respective adjacent optical fiber bundles. Each optical fiber bundle in the array may be optically coupled to a respective image sensor. A data processor may be electrically connected to each image sensor for processing signal output from each of the image sensors.

An assembled compound image sensor array may be calibrated by: scanning the diffractive element with radiation to produce a mathematically determinative diffraction pattern on the input faces of the adjacent optical fiber bundles; determining radiation intensity values for areas between and along abutting edges of the adjacent optical fiber bundles using the mathematically determinative diffraction pattern; and assigning the radiation intensity values for areas between and along said abutting edges of the adjacent optical fiber bundles to respective pixels on input faces of the adjacent optical fiber bundles. Additional calibration steps may include: scanning a ray of radiation across the input faces of each optical fiber bundle of the compound image sensor array; and creating a pixel map comprising an address of each pixel indexed to a respective optical fiber.

The present invention may be utilized with compound sensor arrays for capturing virtually any kind of electromagnetic radiation. For example, a compound audio sensor array may include an array of audio sensors for receiving audio waves emitted from a source. One or more diffractive elements may be provided to diffract audio waves in a mathematically determinative pattern onto input faces of adjacent audio sensors.

According to the present invention, a diffraction pattern can be used to reliably predict what radiation would fall on one or more pixels in an area where no pixels exist, such as in gaps between adjacent optical fiber bundles. By knowing the amount of radiation that should have fallen within an area based on a diffraction pattern, precise images can be reconstructed even though an optical fiber bundle array includes gaps and other optically inactive areas. Accordingly, precise abutting alignment between adjacent optical fiber bundles may not be necessary. Gaps and other optically inactive areas may exist without creating seams within an image produced by the array. Because gaps may be acceptable, manufacturing tolerances need not be as precise as with conventional optical fiber bundle arrays. Accordingly, time and/or costs associated with manufacturing optical fiber bundle arrays may be reduced.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A–10D illustrate operations for creating a pixel map.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
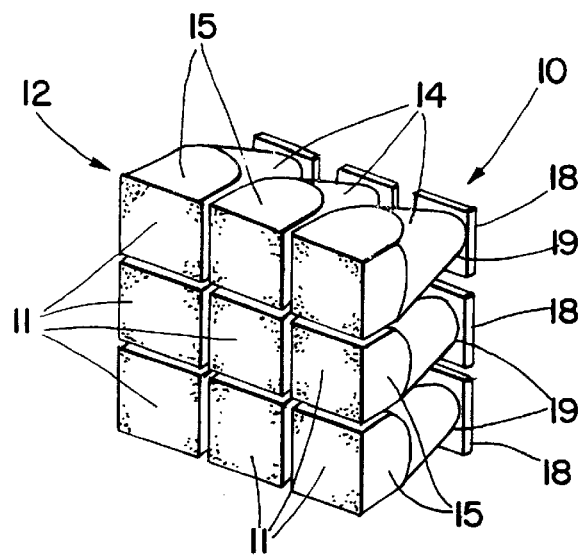
FIG. 1 illustrates a conventional compound image sensor array including a plurality of tapered optical fiber bundles in an array.

Referring now to FIG. 1, a conventional compound image sensor array 10 is illustrated. The illustrated compound image sensor array 10 includes an array 12 of tapered optical fiber bundles 14 wherein each optical fiber bundle is optically coupled with a respective CCD image sensor 18. As is known to those skilled in the art, each tapered optical fiber bundle 14 is formed from a plurality of optical fibers packed closely together and drawn into a tapered shape. In the illustrated embodiment, the input face 11 of each tapered optical fiber bundle 14 has a generally planar configuration. When arranged in an array 12, the input faces 11 of each tapered optical fiber bundle 14 form a generally planar focal plane for receiving an image thereon.

Figure 2C:
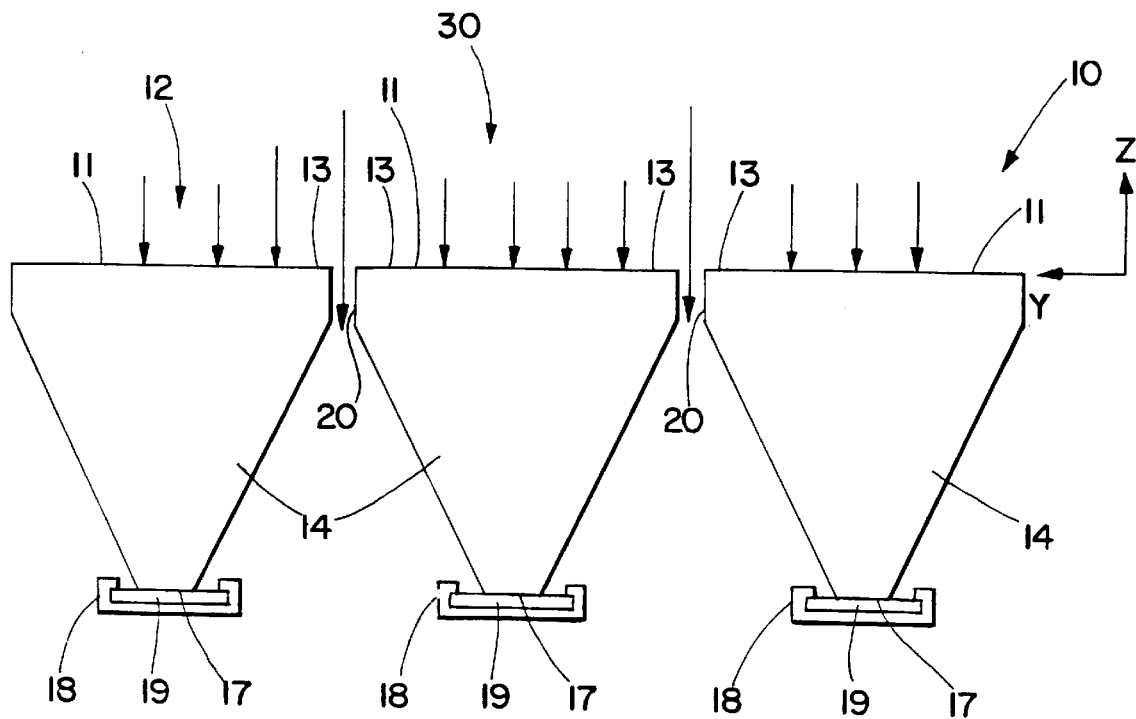
FIGS. 2A–2C illustrate the tapered optical fiber bundles of the conventional compound sensor array of FIG. 1 in greater detail.
Figure 2A:
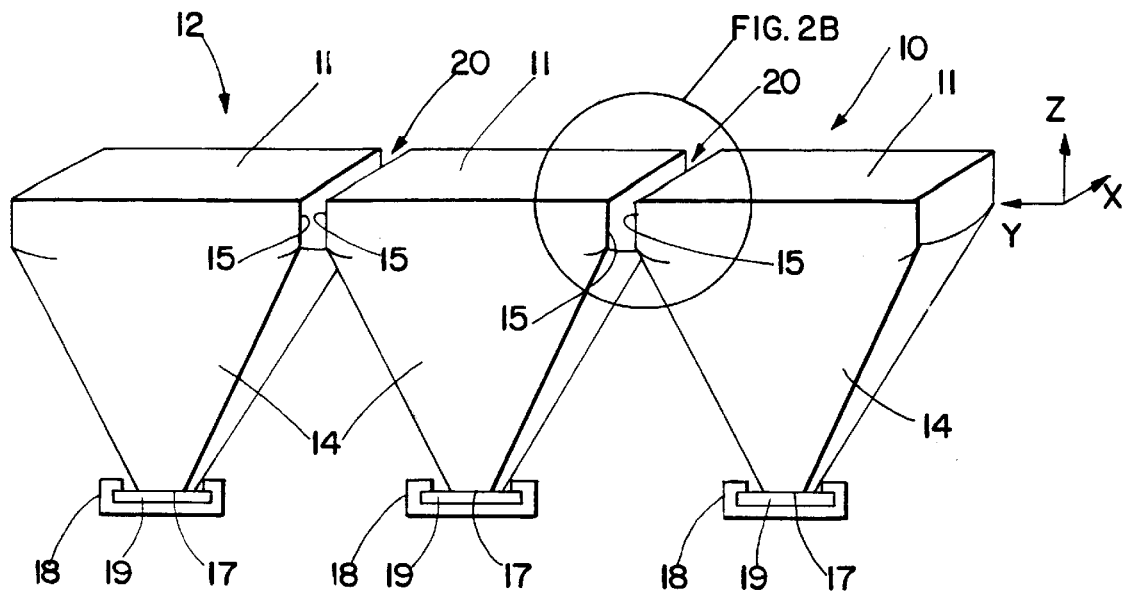

As illustrated in FIG. 2A, each CCD image sensor 18 includes a CCD chip 19 to which light is directed via each respective tapered optical fiber bundle 14. Light exits each optical fiber bundle 14 via an output face 17 opposite a respective input face. As is known to those with skill in the art, a CCD chip is a light-sensitive, solid state device composed of many small light-sensitive picture elements (pixels) arranged in an array. Light falling on a pixel is converted into a charge pulse which is then measured by electronics associated with the CCD chip and represented by a number. The number conventionally ranges from 0 (no light) to 65,536 (very intense light), although other ranges may be used. A digital image may be produced from the collection of light intensity numbers produced by a CCD chip. A data processor can store the image or can display the image by varying the light intensity for each pixel on a computer monitor in the proper order.

As is known to those skilled in the art, a CCD controller reads the image representation from the CCD chip, pixel by pixel, and organizes the image into a digital array. The digital array is then stored so as to be accessible to a data processor for performing various image processing techniques. Digital images can be stored on disk, transmitted over computer networks, and analyzed using various image processing techniques. It is to be understood that the present invention is not limited to CCD image sensors. Various other types of image sensors can be utilized without limitation.

Each tapered optical fiber bundle 14 is a collection of single optical fiber strands assembled together so that the relative orientation of the individual fibers is preferably maintained throughout the length of the bundle. The result is that a pattern of illumination incident at the input face 11 of the bundle 14 re-emerges from the output face 17 with the image preserved as precisely as possible. During the manufacturing process, however, some individual optical fibers may lose their orientation within a bundle, and/or become twisted. Accordingly, an image entering the input face 11 of a bundle 14 may not emerge from the output face 17 exactly the same. Furthermore, optical fibers along the outer edge portions of each bundle may be damaged during forming operations, thereby rendering these optical fibers optically inactive, or may reduce the efficiency thereof. As illustrated in FIG. 1, each optical fiber bundle 14 has portions 15 that have been milled to provide the generally rectangular shape of each input face 11. These milled portions may contain optical fibers that are optically inactive or inefficient because of damage from milling (or other shaping) operations.

As is known to those skilled in the art, optical fiber bundles can be made in a variety of shapes and sizes. Magnification can be achieved by tapering the fibers in the bundle from the input face towards a respective output face. The input and output faces of an optical fiber bundle include the end faces of the optical fibers. Accordingly, a ray of light entering the input face of an optical fiber bundle propagates through an optical fiber and leaves through the output face. In order to successfully couple light from an optical fiber bundle to a CCD chip, the CCD chip and optical fiber bundle are conventionally in very close proximity.

As is known to those skilled in the art, bundles of optical fibers may be used to couple light from x-ray or neutron scintillator screens, chemiluminescent markers, image intensifiers, or streak tubes. When CCD image sensors are utilized in conjunction with X-rays and other sources of radiation, a luminescent film may overlie either the CCD chip or an optical fiber bundle to convert the incident radiation into a luminescent ray.

Figure 2B:
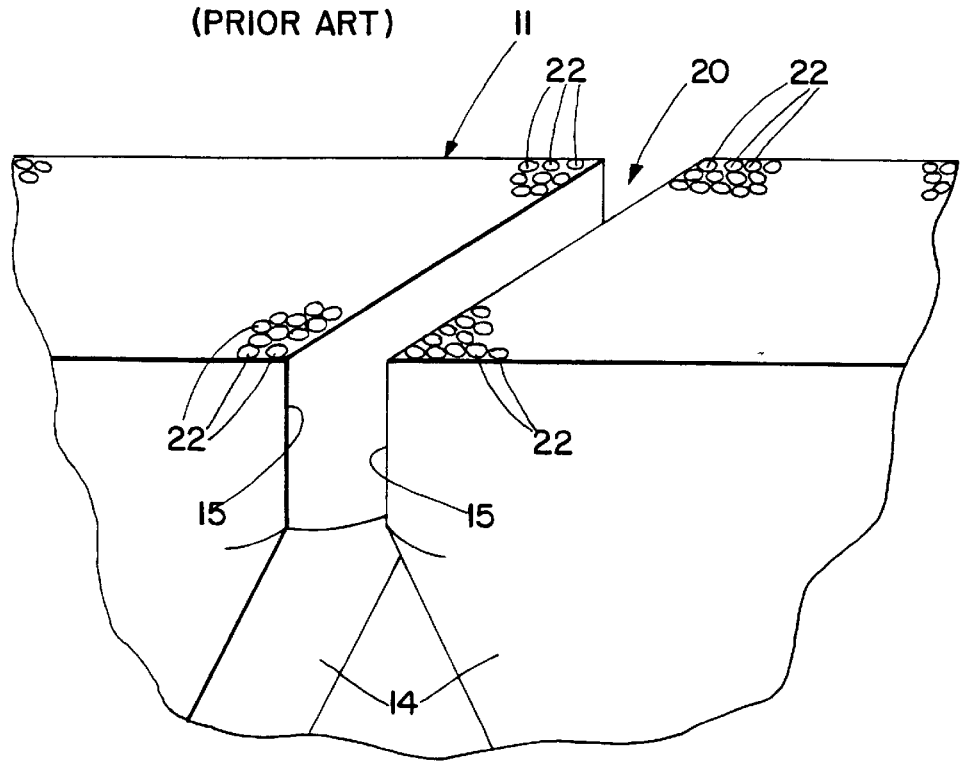

Referring now to FIGS. 2A–2B, the tapered optical fiber bundles 14 of the conventional compound sensor array 10 of FIG. 1 are illustrated in greater detail. Each optical fiber bundle 14 has portions 15 that have been molded or milled to provide the generally rectangular shape of each input face 11 so that adjacent optical fiber bundles can be arranged in close abutting arrangement. FIG. 2B is an enlarged view of adjacent optical fiber bundles 14 and illustrates the individual optical fibers 22 terminating at the input faces 11 of each optical fiber bundle.

Referring now to FIG. 2C, the tapered optical fiber bundles 14 of the conventional compound sensor array 10 of FIG. 1 are arranged such the input faces 11 lie in the same plane (i.e., z=0). Even though adjacent optical fiber bundles are mated as close together as possible, gaps 20 may exist between adjacent optical fiber bundles 14, as illustrated (i.e., along the y axis). A portion of the radiation (i.e., light) 30 emitted from a source passes through these gaps 20 and is not directed to a CCD image sensor 18. Furthermore, optical fibers 22 along the outer edge portion 13 of an input face 11 may be optically inactive so that radiation incident thereon is not transmitted to the CCD chip 19.

Figure 3A:
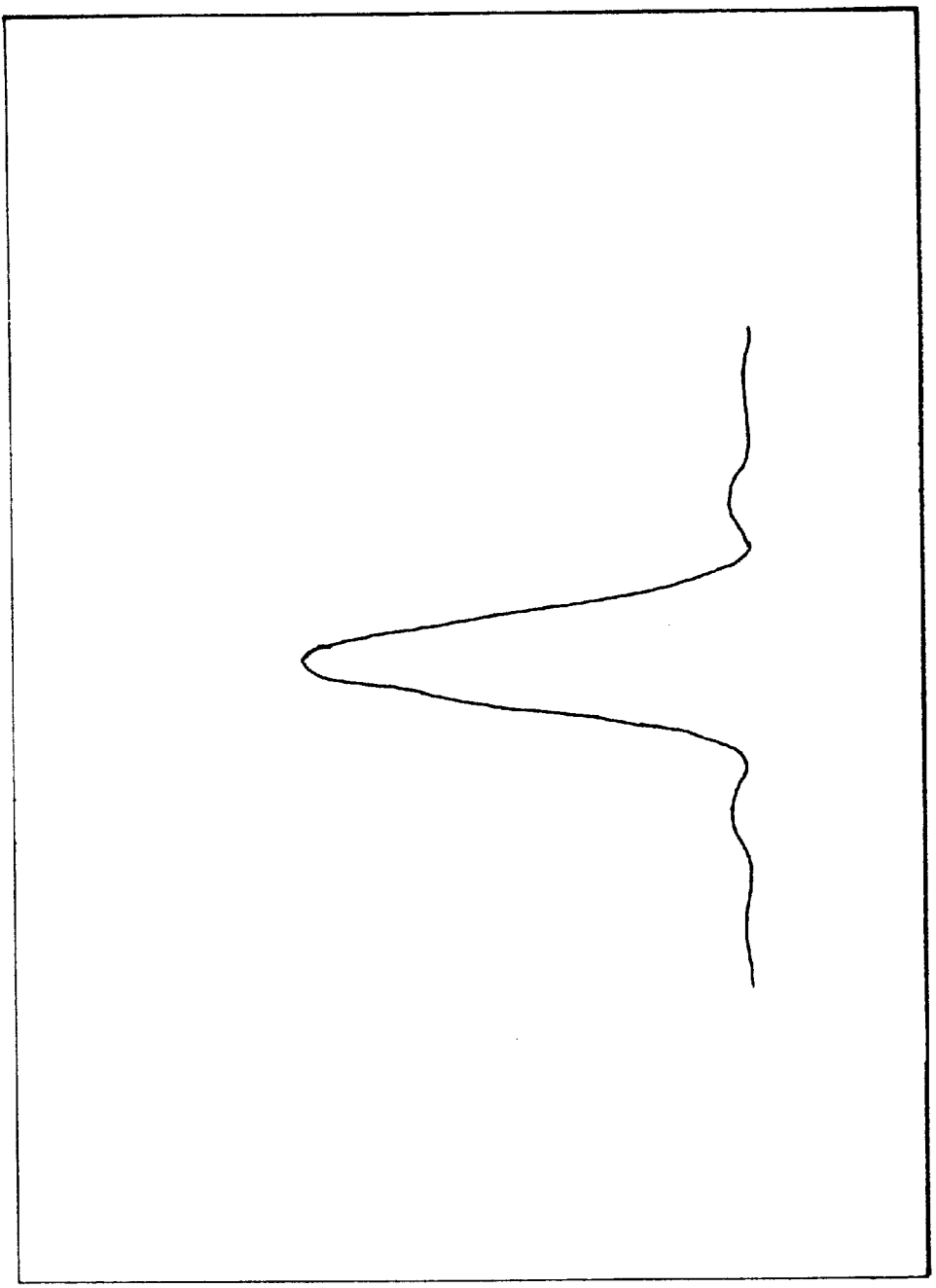
FIG. 3A is an exemplary diffraction pattern produced by light passing through a single slit diffraction grating.

As is known to those skilled in the art of optics, diffraction is the spreading out of waves, such as sound, light, or any kind of radiation, as the waves pass by the edge of an obstacle or through an opening. Diffraction patterns are produced when radiation, such as light, passes through a slit or aperture, or by an edge of an object. An exemplary diffraction pattern, resulting from light passing through a single slit diffraction grating, is graphically illustrated in FIG. 3A.

Figure 3B:
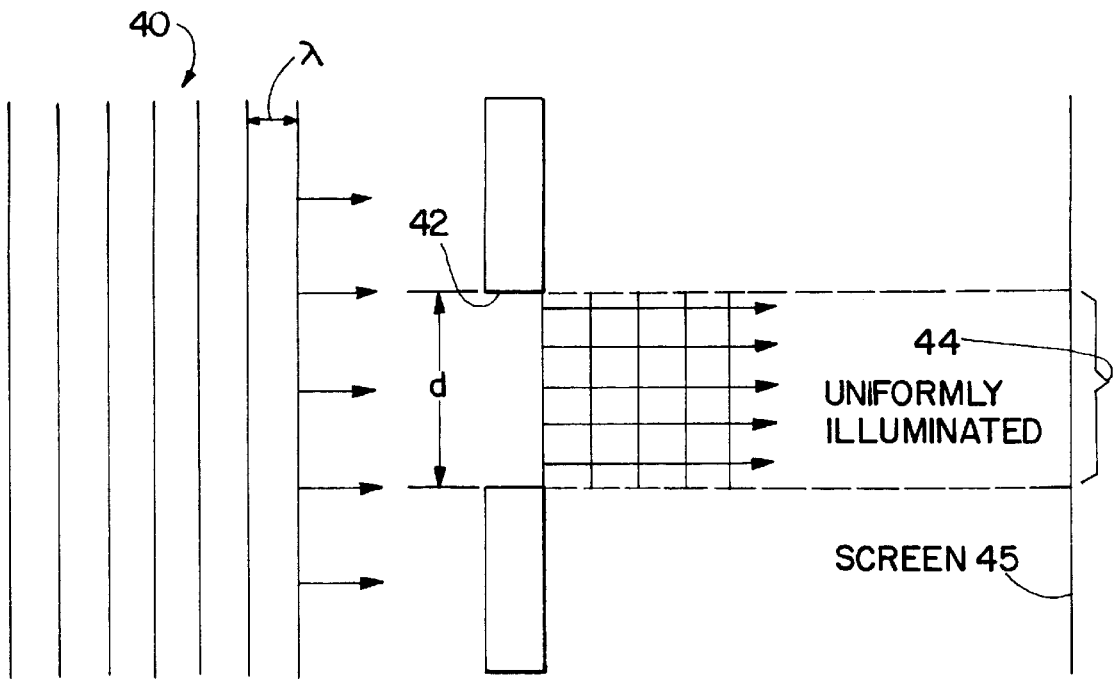
FIGS. 3B–3C illustrate the relationship of wavelength to the size of a slit or aperture within a diffraction grating.
Figure 3C:
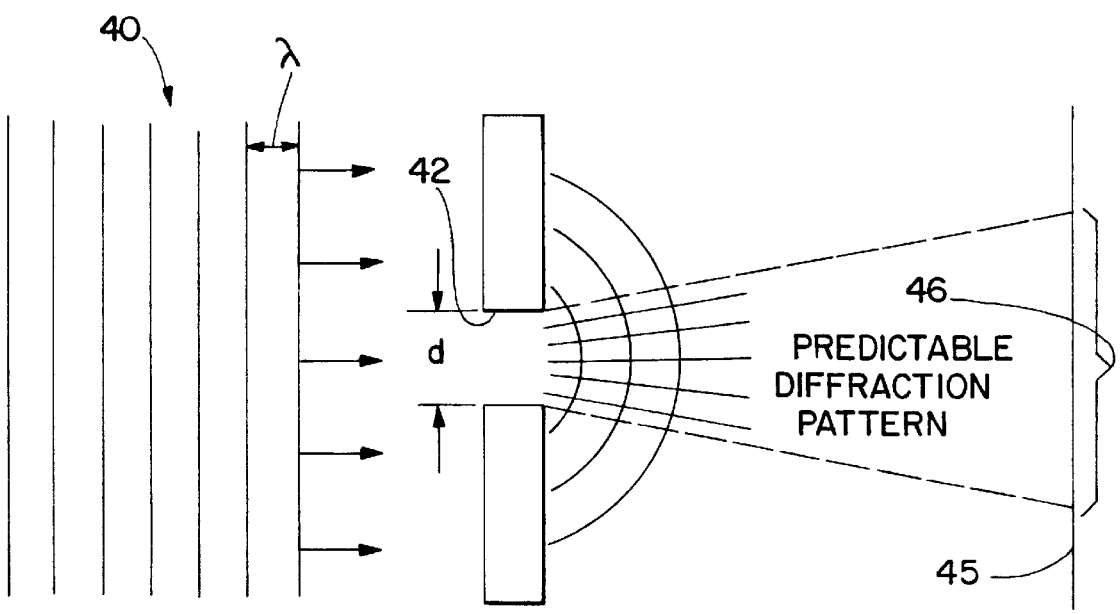

As illustrated in FIG. 3B, when the diameter d of an aperture 42 is substantially greater than the wavelength λ of radiation 40 passing therethrough, no diffraction patterns are created. A screen 45 placed on the other side of the aperture 42 of FIG. 3B receives a uniformly illuminated pattern of light 44. However, as illustrated in FIG. 3C, when the diameter d of an aperture 42 is less than or equal to the wavelength λ of radiation 40 passing therethrough, a diffraction pattern 46 is produced on a screen 45 placed on the other side of the aperture 42. When the wavelength λ of radiation and the size of a slit or object are known, a resulting diffraction pattern is mathematically predictable. In other words, it is possible to predict, using known mathematical equations, what a diffraction pattern will look like. Exemplary mathematical models for predicting diffraction patterns are described in "Optics" by K. D. Möller, p. 129–176, published by University Science Books, 1988, and which is incorporated herein by reference in its entirety.

Figure 3D:
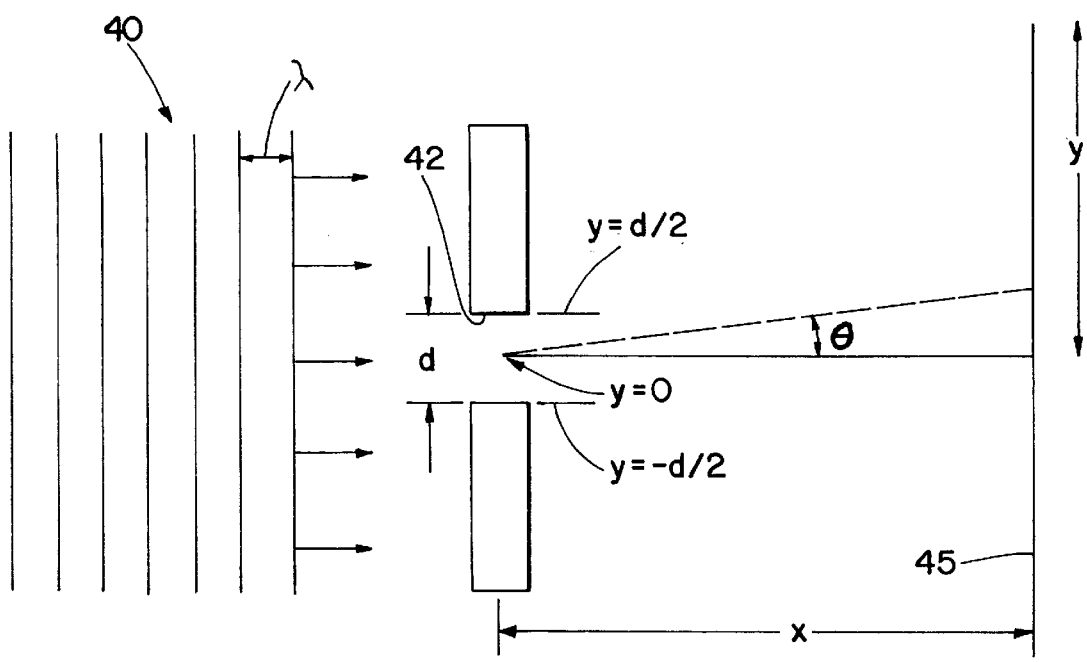
FIG. 3D illustrates the geometry for the observation of a single slit diffraction pattern.

Referring to FIG. 3D, the well known and understood Fraunhofer diffraction principle can be used to determine the intensity I of a diffraction pattern via the following equation:

$$I = \frac{\sin^2[\pi(d/2)(y/x)]}{[\pi(d/\lambda)(y/x)]^2}$$

where d is the width of the slit 42 and λ is the wavelength of light. X is the distance from the slit to the screen 45 and Y is the length of the screen 45. It is to be understood that the Fraunhofer diffraction principle can also be utilized to determine the intensity I of a diffraction pattern created by a wire instead of a slit. As is understood by those skilled in this art, a wire would produce an identical diffraction pattern 180° out of phase with that produced by the slit 42 of FIG. 3D.

According to the present invention, a mathematically determinative diffraction pattern can be used to reliably predict what light would fall on one or more pixels in an area where no pixels exist, such as in gaps between adjacent optical fiber bundles. In addition, for known optically inactive areas, a reliable prediction of light falling on these optically inactive areas can be made. By knowing the amount of light that should have fallen within an area based on a known diffraction pattern, precise images can be reconstructed even though an optical fiber bundle array includes gaps and other optically inactive areas.

For example, let the sensed image be G after it has been mapped to a regular array with two indices. Consider a coordinate system with two indices oriented as in FIG. 2A, with z=0 in the plane of the taper faces, the y=0 plane in the center of a gap, and the x=0 plane near the center of two abutting tapers. Define I as the integer index along x and J as the integer index along y, so that G(I,J) has missing values for all pixels with J=0.

In general, G will have other missing pixels for other values of J at parallel gaps and at other values of I at perpendicular gaps. Since the diffraction pattern from any particular diffracting body is local, it will affect only nearby pixels, say with –L<J<L where L is the integer width in pixels that contains most of the diffraction pattern. In the simplest case, in which the diffracting object is nearly uniform, the problem can be treated one-dimensionally. More complex cases could be solved by one skilled in this art.

In the one-dimensional case, let g(J)=G(0,J) and let f(J) be the true image at pixel J. The one-dimensional problem now is to estimate f(J) from the available g(J). Let v(J) be the diffraction pattern at pixel J for unit illumination at pixel 0, so that g(J)=f(J)+f(0)*v(J). Those skilled in the art of image restoration will be aware of several ways of estimating f(J) for –L<J<L, but a simple estimation of f(J) for J=–L to J=L is that set of f(J) that minimizes the error functional below:

$$E[f] = \Sigma -L<J<L; J\neq 0 \{g(J)-f(0)*v(J)\}^2 + \lambda \Sigma -L<J<L \{f(J+1)-f(J)\}^2$$

The above trades fidelity to g(J) against smoothness of f.

Figure 4:
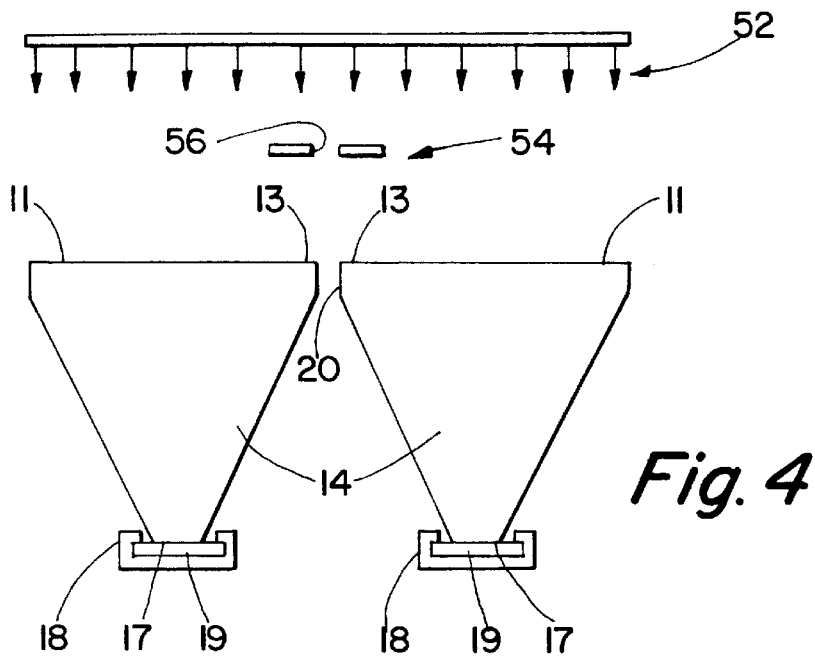
FIG. 4 illustrates a diffractive element positioned above a gap between adjacent optical fiber bundles in an array.

Referring now to FIG. 4, a pair of adjacent optical fiber bundles 14 are illustrated with a gap between edge portions 13 thereof. A diffractive element 54 is positioned above the gap 20 between the optical fiber bundles. When radiation 52 from a source 50 (i.e., light, x-rays, and the like) passes by the diffractive element 54 a mathematically determinative diffraction pattern is produced on the respective input faces 11 of the two adjacent optical fiber bundles 14.

In the illustrated embodiment, the diffractive element 54 is a diffraction grating having an aperture 56. However, various diffractive elements having various configurations may be utilized without departing from the spirit and intent of the present invention. For example, as illustrated in FIGS.

Figure 5A:
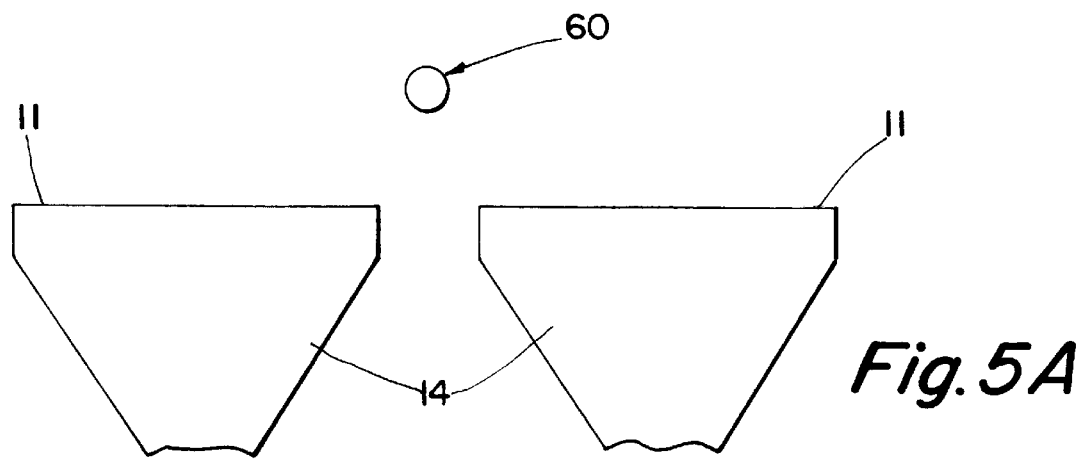
FIGS. 5A–5B illustrate various diffractive elements that may be used in accordance with the present invention.
Figure 5B:
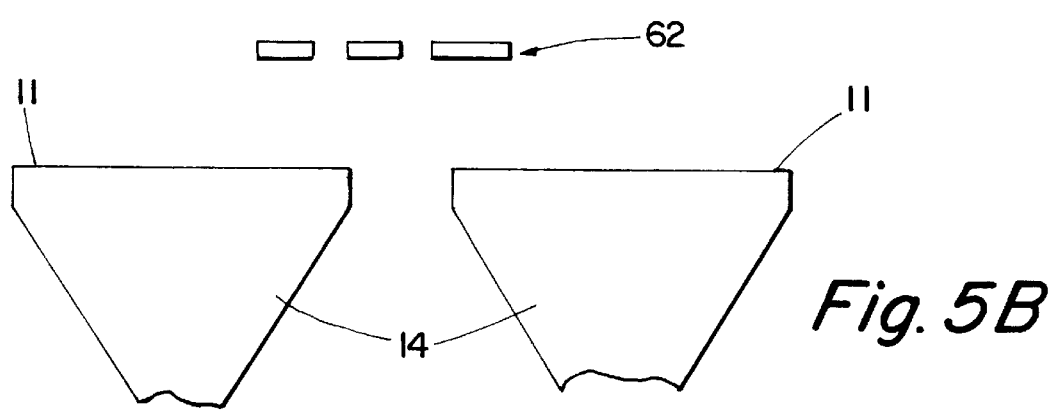

5A and 5B, a diffractive element may include a wire 60 (FIG. 5A) and a multi-slotted diffraction grating 62 (FIG. 5B). The diffractive element could be an element that allows greater intensity radiation through one or more portions than through other portions of the element. For example, the translucency of a translucent element could be varied to produce diffraction at desired locations. Furthermore, a diffractive element utilized with the present invention could have virtually any shape.

Figure 6:
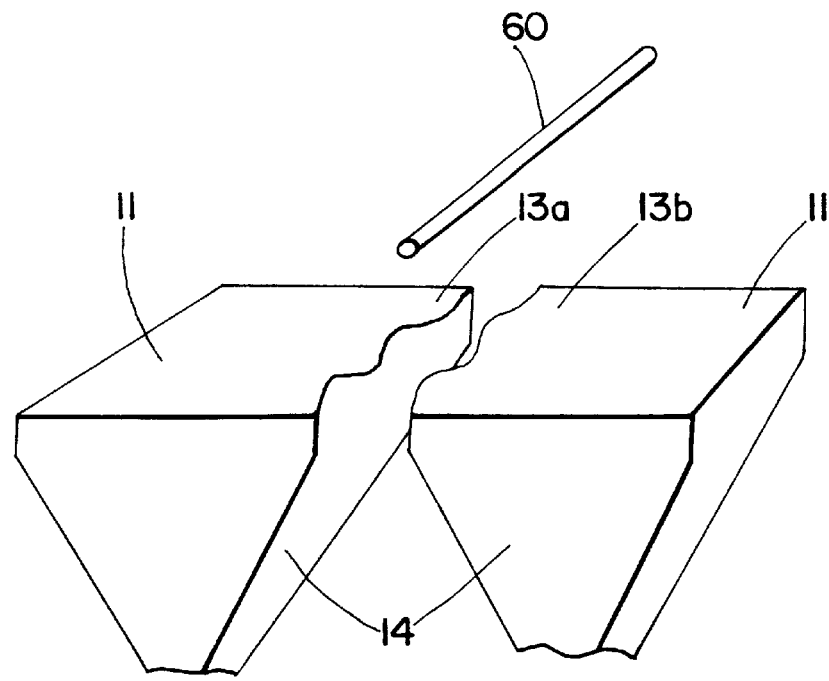
FIG. 6 illustrates a diffractive element positioned above a gap between adjacent optical fiber bundles in an array having irregular shaped edge portions.
Figure 11:
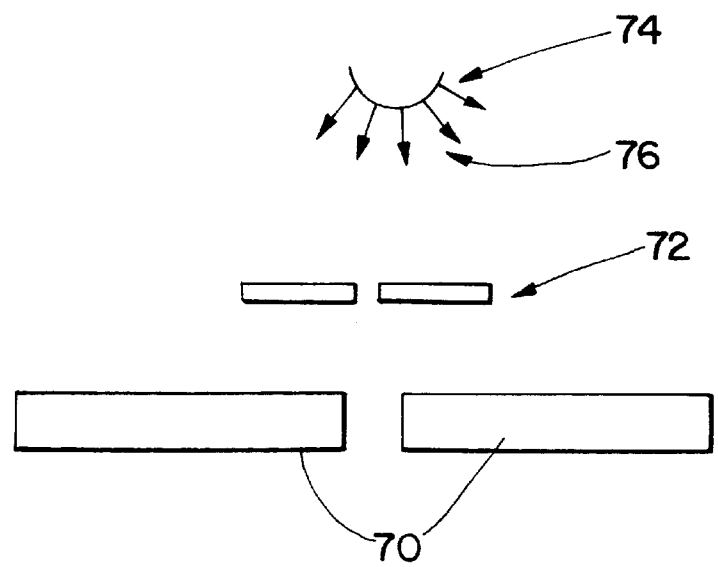
FIG. 11 illustrates a diffractive element positioned above a gap between adjacent audio sensors in an array according to an embodiment of the present invention.

It is to be understood that the present invention may be utilized with compound sensor arrays of various configurations and types. Also, various numbers and configurations of optical fiber bundles in an array may be utilized without departing from the spirit and intent of the present invention. For example, as illustrated in FIG. 6, optical fiber bundles 14 having irregular shaped edge portions 13a, 13b may be used to produce high quality images without seams by utilizing a diffractive element 60 to produce a predictable diffraction pattern in accordance with the present invention.

Figures 7, 8:
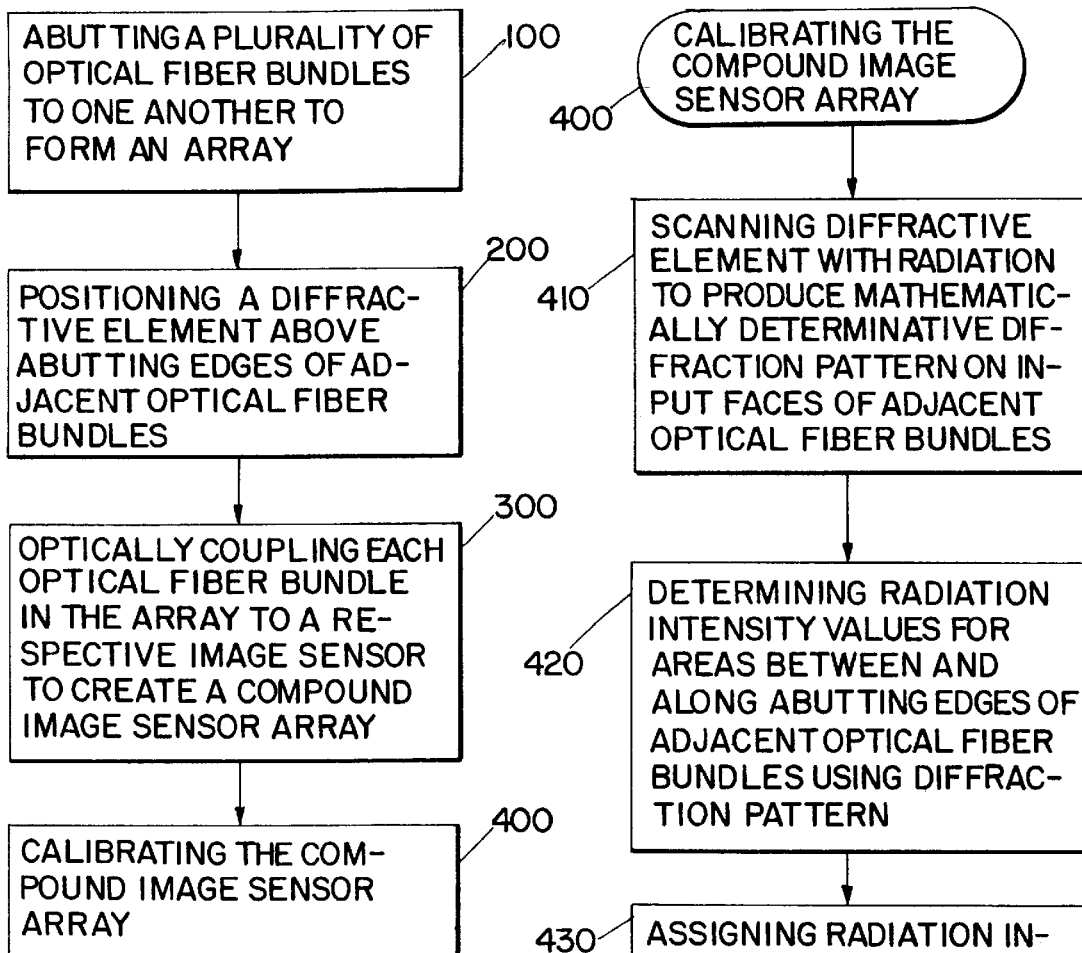
FIGS. 7–9 schematically illustrate operations for carrying out various aspects of the present invention.

Referring now to FIGS.7–8, operations for a producing a compound sensor array according to the present invention are schematically illustrated. A plurality of optical fiber bundles are abutted to one another to form an array (Block 100). A diffractive element is positioned above abutting edges of adjacent optical fiber bundles (Block 200). Each optical fiber bundle in the array is optically coupled to a respective image sensor (Block 300). The assembled compound image sensor array is calibrated to correct for optical fibers that are damaged or otherwise dislocated within the bundles (Block 400).

As illustrated in FIG. 8, operations for calibrating the compound image sensor array (Block 400) include scanning the diffractive element with radiation to produce a mathematically determinative diffraction pattern on the input faces of adjacent optical fiber bundles (Block 410). Radiation intensity values for areas between and along the abutting edges of adjacent optical fiber bundles are determined using the diffraction pattern (Block 420). Radiation intensity values for areas between and along the abutting edges of adjacent optical fiber bundles are assigned to respective pixels on the input faces of the adjacent optical fiber bundles. (Block 430). Calibration operations also include scanning a ray of radiation across the input faces of each optical fiber bundle of the compound image sensor array (Block 440); and creating a pixel map comprising an address of each pixel indexed to a respective optical fiber (Block 450).

Figure 9:
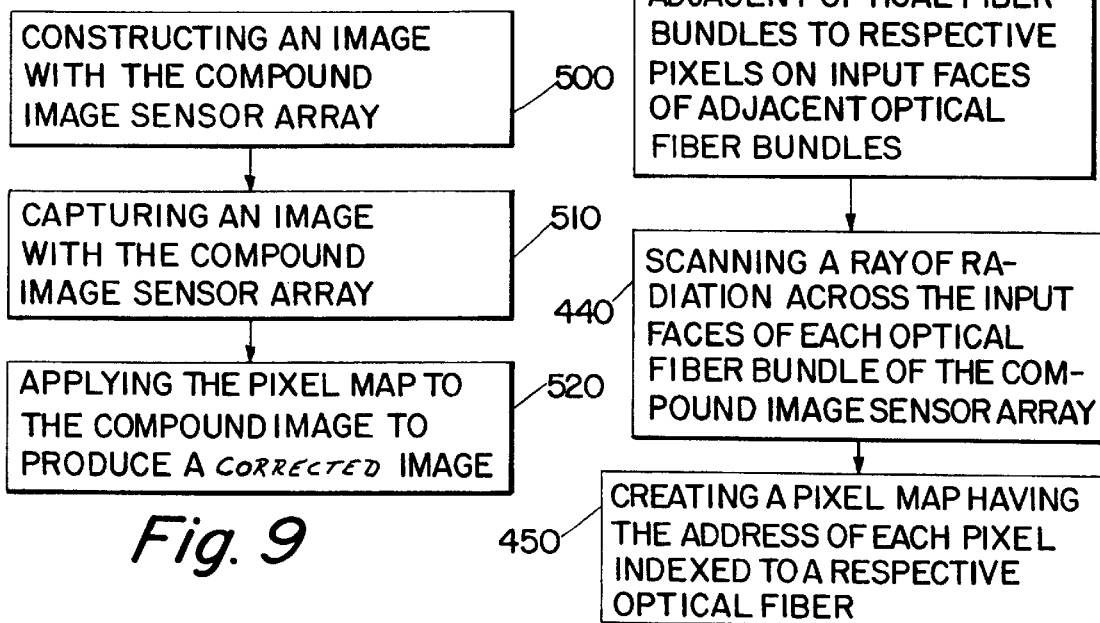

Referring to FIG. 9, operations for constructing an image with a compound image sensor array (Block 500) include capturing an image with a compound image sensor array (Block 510) and applying a pixel map to the captured image to produce a correct image (Block 520). According to the present invention, a corrected image can be obtained by applying a pixel map created as described above to a stored image captured via a compound sensor array.

Figure 10A:
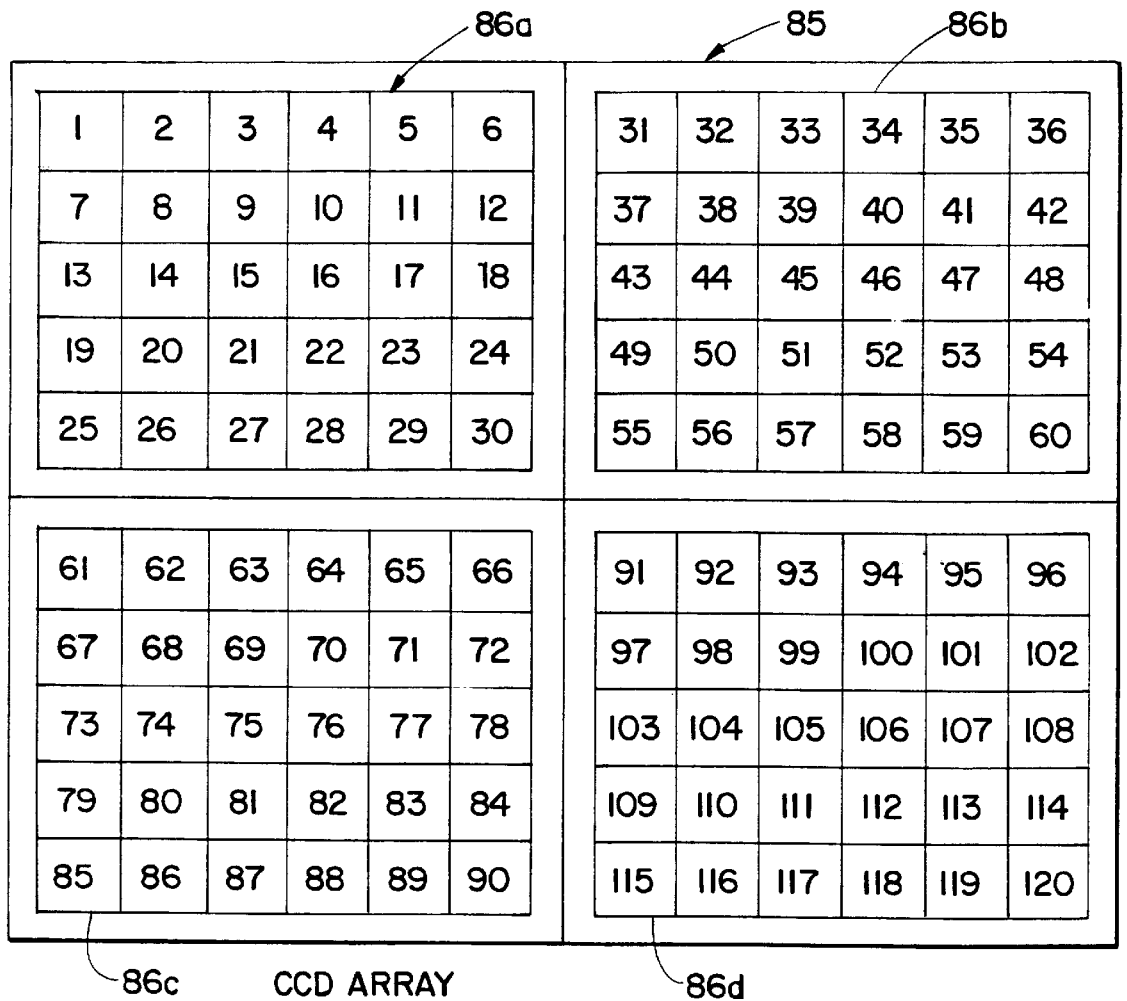
Figure 10B:
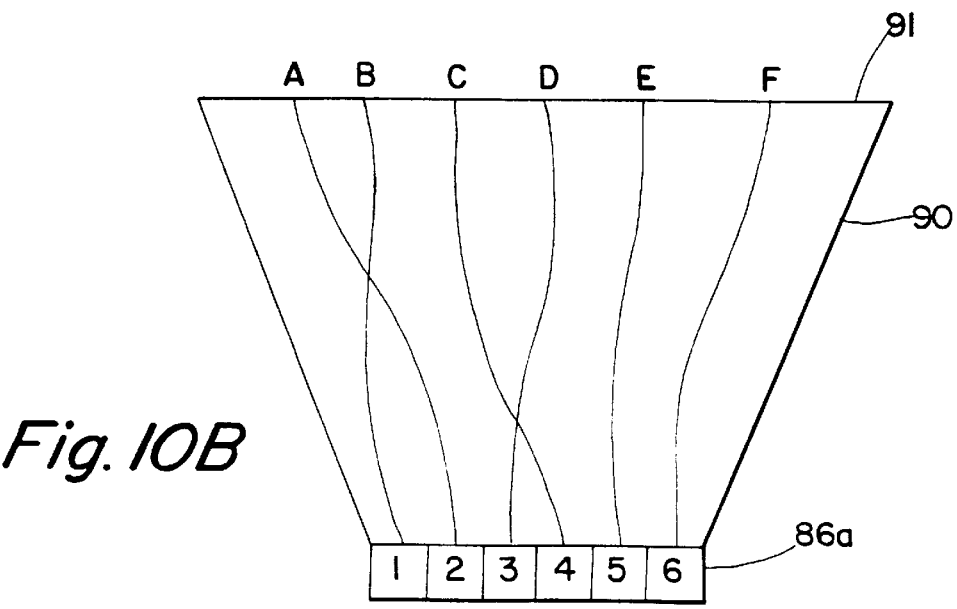

Referring now to FIGS. 10A–10D, operations for creating a pixel map are illustrated. Referring initially to FIG. 10A, a simplified CCD image sensor array is illustrated. For illustrative purposes, the array includes four CCD chips 86a, 86b, 86c, 86d each having 6 by 5 arrays of pixels, numbered 1–30; 31–60; 61–90; and 91–120, respectively. Referring now to FIG. 10B a cross-sectional view of a portion of a tapered optical fiber bundle 90 configured to optically couple with the first row of pixels (pixels 1–6) of CCD chip 86a is schematically illustrated. Also illustrated are optical fibers (A, B, C, D, E, F) which, if correctly aligned, would be optically coupled to pixels 1, 2, 3, 4, 5, and 6, respectively. However, as illustrated, optical fibers A and B are twisted and are optically coupled with pixels 2 and 1, respectively. Similarly, optical fibers C and D are twisted and are optically coupled with pixels 4 and 3, respectively. A ray of light entering optical fiber A will be incident upon pixel 2, rather than pixel 1. Similarly, a ray of light entering optical fibers B, C, and D will be incident upon pixels 1, 4, and 3, rather than pixels 2, 3, and 4. Accordingly, an image transmitted from the input face 91 of the tapered optical fiber bundle 90 along the optical fibers A–F to the CCD chip will have portions thereof transposed.

To correct the problems caused by misaligned or damaged optical fibers within a bundle, a compound sensor array is calibrated by scanning a ray of light across the input faces of the array of optical fiber bundles and recording in a pixel map the address of each pixel activated by each respective optical fiber. FIG. 10C schematically illustrates a pixel map 95 for the compound sensor array of FIG. 10A. The actual address of each pixel in a CCD chip in the compound sensor array is identified at the upper left corner of each pixel. The perceived address of each pixel, based upon light impinging the input face of the optical fiber bundle is identified in the center. A pixel map may include a table, linked list shift register, memory array or any other techniques for storing an array.

Referring now to FIG. 10D, a stored image 97 captured by the compound image sensor array of FIG. 10A is schematically illustrated. Light (or radiation) intensity values are stored within each pixel as illustrated. A corrected image can be obtained by applying the pixel map 95 to the stored image. In the illustrated example, the stored light intensity values for pixels 1 and 2 would be transposed. Similarly, the stored light intensity values for pixels 3 and 4 would be transposed. For example, the diffraction pattern can be subtracted from the measured g(J) by replacing it with the previously estimated f(J) as discussed above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A compound image sensor array for producing a substantially seamless image, comprising:
    an array of image sensors;
    a plurality of optical fiber bundles for directing radiation emitted from a source to said array of image sensors along a longitudinal direction;
    wherein each optical fiber bundle comprises an output face and an opposite input face, said input face substantially normal to the longitudinal direction and configured to receive incident radiation from said source thereon; and means for diffracting said radiation in a mathematically determinative pattern on respective input faces of at least two adjacent optical fiber bundles along abutting edges thereof.

2. A compound image sensor array according to claim 1 wherein said means for diffracting said radiation in a mathematically determinative pattern comprises a diffractive element positioned in spaced apart relation from said abutting edges of said at least two respective adjacent optical fiber bundles.

3. A compound image sensor array according to claim 2 wherein said diffractive element comprises a diffraction grating having at least one slot with a width less than or equal to a wavelength of said emitted radiation.

4. A compound image sensor array according to claim 1 wherein said optical fiber bundles comprise optical fibers that are tapered such that a diameter of said optical fibers is less at the output face than at the input face of said bundles.

5. A compound image sensor array according to claim 1 wherein each image sensor comprises a CCD chip that converts radiation incident thereon into electrical signals.

6. A compound image sensor array according to claim 1 further comprising a data processor electrically connected to each image sensor that processes signal output from each of said image sensors.

7. A compound image sensor array according to claim 1 further comprising means for determining radiation intensity values for areas between and along said abutting edges of said at least two respective adjacent optical fiber bundles using said mathematically determinative diffraction pattern.

8. A compound image sensor array according to claim 1 wherein an input face of at least one of said at least two respective adjacent tapered optical fiber bundles comprises an irregular shaped edge portion.

9. An array of optical fiber bundles for directing radiation emitted from a source to an array of image sensors along a longitudinal direction, said array comprising:

a plurality of optical fiber bundles in abutting relationship, wherein each optical fiber bundle comprises an output face and an opposite input face, said input face substantially normal to the longitudinal direction and configured to receive incident radiation from said source thereon; and means for diffracting said radiation in a mathematically determinative pattern on respective input faces of at least two adjacent optical fiber bundles along abutting edges thereof, said diffracting means overlying said input faces of said optical fiber bundles.

10. An array of optical fiber bundles according to claim 9 wherein said means for diffracting said radiation in a mathematically determinative pattern comprises a diffractive element overlying said abutting edges of said at least two respective adjacent optical fiber bundles.

11. An array of optical fiber bundles according to claim 10 wherein said diffractive element comprises a diffraction grating having at least one slot with a width less than or equal to a wavelength of said emitted radiation.

12. An array of optical fiber bundles according to claim 9 wherein said optical fiber bundles comprise optical fibers that are tapered such that a diameter of said optical fibers is less at the output face than at the input face of said bundles.

13. An array of optical fiber bundles according to claim 9 wherein an input face of at least one of said at least two respective adjacent tapered optical fiber bundles comprises an irregular shaped edge portion.

14. An array of optical fiber bundles according to claim 9 wherein said optical fiber bundles comprise optical fibers that are tapered such that a diameter of said optical fibers is less at the output face than at the input face of each of said bundles.

15. An imaging system comprising:

a radiation source;

an array of image sensors;

a plurality of optical fiber bundles for directing radiation emitted from a source to said array of image sensors along a longitudinal direction;

wherein each optical fiber bundle comprises an output face and an opposite input face, said input face substantially normal to the longitudinal direction and configured to receive incident radiation from said source thereon;

means for diffracting said radiation in a mathematically determinative pattern on respective input faces of at least two adjacent optical fiber bundles along abutting edges thereof; and a data processor electrically connected to each image sensor that processes signal output from each of said image sensors.

16. An imaging system according to claim 15 further comprising means for calibrating said compound image sensor array.

17. An imaging system according to claim 16 wherein said means for calibrating said compound image sensor array comprises:

means for scanning the diffractive element with radiation to produce a mathematically determinative diffraction pattern on the input faces of the at least two respective adjacent optical fiber bundles;

means for determining radiation intensity values for areas between and along said abutting edges of said at least two respective adjacent optical fiber bundles using the mathematically determinative diffraction pattern; and means for assigning the radiation intensity values for areas between and along said abutting edges of said at least two respective adjacent optical fiber bundles to respective pixels on input faces of the at least two respective adjacent optical fiber bundles.

18. An imaging system according to claim 16 wherein said means for calibrating the compound image sensor array further comprises:

means for scanning a ray of radiation across the input faces of each optical fiber bundle of the compound image sensor array; and means for creating a pixel map comprising an address of each pixel indexed to a respective optical fiber.

19. An imaging system according to claim 15 wherein said optical fiber bundles comprise optical fibers that are tapered such that a diameter of said optical fibers is less at the output face than at the input face of said bundles.

20. An imaging system according to claim 15 wherein each image sensor comprises a CCD chip that converts radiation incident thereon into electrical signals.

21. An imaging system according to claim 15 wherein an input face of at least one of said at least two respective adjacent tapered optical fiber bundles comprises an irregular shaped edge portion.

22. A method of producing a compound image sensor array, said method comprising the steps of:

abutting a plurality of optical fiber bundles to one another to form an array, wherein each optical fiber bundle comprises an input face configured to receive incident radiation thereon from a radiation source; and positioning a diffractive element above abutting edges of at least two respective adjacent optical fiber bundles, said diffractive element configured to diffract radiation in a mathematically determinative pattern on the input faces of the at least two respective adjacent optical fiber bundles.

23. A method according to claim 22 further comprising calibrating the compound image sensor array.

24. A method according to claim 23 wherein said step of calibrating the compound image sensor array comprises the steps of:

scanning the diffractive element with radiation to produce a mathematically determinative diffraction pattern on the input faces of the at least two respective adjacent optical fiber bundles;

determining radiation intensity values for areas between and along the abutting edges of the at least two respective adjacent optical fiber bundles using the mathematically determinative diffraction pattern; and assigning the radiation intensity values for areas between and along the abutting edges of the at least two respective adjacent optical fiber bundles to respective pixels on input faces of the at least two respective adjacent optical fiber bundles.

25. A method according to claim 24 further comprising the steps of:

scanning a ray of radiation across the input faces of each optical fiber bundle of the compound image sensor array; and creating a pixel map comprising an address of each pixel indexed to a respective optical fiber.

26. A method according to claim 22 further comprising optically coupling each optical fiber bundle in the array to a respective image sensor.

27. A method according to claim 22 further comprising the step of electrically connecting a data processor to each image sensor for processing signal output from each of the image sensors.

* * * * *